United States Patent [19]

Yatsu et al.

[11] Patent Number: 5,033,335
[45] Date of Patent: Jul. 23, 1991

[54] COATING STRIPPER FOR OPTICAL FIBERS

[75] Inventors: Hiroyuki Yatsu; Akio Goto, both of Ichihara, Japan

[73] Assignee: Furukawa Electric Co., Ltd., Tokyo, Japan

[21] Appl. No.: 511,422

[22] Filed: Apr. 19, 1990

[30] Foreign Application Priority Data

Apr. 20, 1989 [JP] Japan .................................. 1-101189

[51] Int. Cl.[5] .............................................. H02G 1/12
[52] U.S. Cl. ......................................... 81/9.4; 81/9.51
[58] Field of Search .................................. 81/9.4–9.51; 219/229, 236

[56] References Cited

U.S. PATENT DOCUMENTS

| | | | |
|---|---|---|---|
| 2,978,565 | 4/1961 | Sullivan et al. | 81/9.44 |
| 3,765,276 | 10/1973 | Pollitt | 81/9.51 |
| 3,980,861 | 9/1976 | Fukunaga | 81/9.4 X |
| 4,261,231 | 4/1981 | Bleakley | 81/9.51 |
| 4,932,291 | 6/1990 | Potesta | 81/9.44 |

Primary Examiner—James G. Smith
Attorney, Agent, or Firm—Foley & Lardner

[57] ABSTRACT

There is provided a coating stripper for optical fibers comprising a pair of clamp members each having a matching surface provided with a coating cutting edge, a coating pinching section and a coating holding section arranged in line on said matching surface with said coating pinching section located between said coating cutting edge and said coating holding section, any neighboring ones of said coating cutting edge, said coating pinching section and said coating holding section being contiguous with each other, each of said pair of coating cutting edges, said pair of coating pinching sections and said pair of coating holding sections being swingable relative to each other, both of said pair of coating pinching sections being made of a hard material, at least either of said pair of coating holding sections being made of a soft material and provided with a heater arranged in it. Such a stripper can securely clamp an end portion of a coated optical fiber and ensures good thermal insulation at and around the cutting lines of the coating layers, easy separation of the split coating layers and consequently an excellent performance of operation of removing an end portion of the coating layers of a coated optical fiber.

8 Claims, 2 Drawing Sheets

COATING STRIPPER FOR OPTICAL FIBERS

BACKGROUND OF THE INVENTION

1. Applicable Field of the Invention

This invention relates to a coating stripper to be suitably used for terminating a coated optical fiber for connection with another optical fiber or equipment.

2. Prior Art

A connecting means called an optical connector is popularly used for connecting an optical fiber with another optical fiber and/or with equipment. A so-called fusion connector that utilizes discharge heat is widely used for interconnection of optical fibers.

In any case, be it a single core plastic-coated optical fiber or a multiple plastic-coated optical fiber, the coating of the optical fiber should be removed from an end thereof to expose the optical fiber of that area.

To remove the coating layer of an optical fiber having a coating layer formed on the outer periphery of the optical fiber at an end thereof, a pair of juxtaposed edges of a cutter are arranged transverse to the axis of the coated optical fiber and so moved that they cut into the coating layer. Thereafter, the coated optical fiber and/or the cutter are subjected to a tensile force applied in a direction suitable for effecting separation of the coating layer and the optical fiber (axial direction of the coated optical fiber).

With such an operation, the coating layer comes to have a crack at and around the spots where it is cut by the edges and consequently the coating layer of the end area can be removed from the optical fiber.

When the coating layer of a coated optical fiber is relatively loosely fitted to the optical fiber, an end portion of the coating layer may be easily and neatly removed from the optical fiber by simply holding the edges of the cutter under a condition where the edges cut into the coating layer but are separated from each other by an appropriate distance.

When, on the contrary, the coating layer of a coated optical fiber is firmly fitted to the optical fiber, a heater may also be used to heat and soften the coating layer along with a cutter that physically breaks the layer.

As the coating layer is softened by heat, the affinity between the optical fiber and the coating layer is reduced so that they may be separated from each other with ease.

FIG. 3 of the accompanying drawings illustrates a coating stripper for optical fibers, known in the art, as described above.

In FIG. 3, the coating stripper comprises a pair of clamp members 1A, 1B having matching surfaces 2a, 2b respectively provided with cutting edges 3a, 3b and coating holding members 4a, 4b, said clamp members 1A, 1B being connected with each other by means of a hinge 5 so that the pair of cutting edges 3a, 3b as well as the pair coating holding members 4a, 4b may be swingable relative to each other. Moreover, a heater 6 is embedded in the clamp member 1A.

Covered optical fiber 11 of FIG. 3 comprises a quartz type optical fiber 12 and plastic coating layers 13, 14 formed around the outer periphery of the optical fiber 12.

It should be noted that the coating layer 13 constitutes an internal coating layer and the coating layer 14 constitutes an external coating layer of the optical fiber 12 when the coated optical fiber 11 is a single core coated optical fiber, whereas, if the coated optical fiber 11 is a coated multifiber as illustrated in FIG. 4, the coating layer 13 represents a coating layer for each single core optical fiber and the coating layer 14 represents a coating layer that coats all the optical fibers that constitute the coated multifiber.

Referring to FIG. 3 once again, when the coating layers 13, 14 are removed at an end area of the coated optical fiber 11, firstly the clamp member 1B is rotationally moved in the direction as indicated by arrow I in order to separate the pair of coating cutting edges 3a, 3b from each other as well as the coating holding members 4a, 4b. Then the coated optical fiber 11 is placed on the coating cutting edge 3a and the coating holding member 4a of the clamp member 1A at an end area of the coating and thereafter the clamp member 1B is moved back in the direction as indicated by arrow II to close the pair of coating cutting edges 3a, 3b as well as the pair of coating holding members 4a, 4b. At the same time the end area of the coating layer 13 and that of the layer 14 are heated by the heater 6.

Now, the end area of the coated optical fiber 11 is clamped by the pair of coating holding members 4a, 4b and the coating layers 13, 14 are cut by the pair of coating cutting edges 3a, 3b.

If the coated optical fiber 11 is pulled in the direction as indicated by arrow III under this condition, the coating layers 13, 14 are split along the cutting lines of the coating cutting edges 3a, 3b and the core optical fiber 12 is pulled away from the portion of the coating layers separated and retained by the coating holding members 4a, 4b of the respective clamp members 1A, 1B.

PROBLEMS TO BE SOLVED BY THE INVENTION

Any coating stripper for optical fibers including one as illustrated in FIG. 3 should meet the following requirements.

Firstly, such a stripper should firmly hold the coating layers 13, 14 at and near the coating cutting edge pair 3a, 3b and at the same time it should not transfer heat from the heater 6 to the cutting area of the coating layer 13 and that of the layer 14.

Such a requirement needs to be met because, if the cutting area of the coating layer 13 and that of the coating layer 14 are not firmly held, the coating cutting edges 3a, 3b obviously do not properly cut into the layers 13, 14 and therefore the layers 13, 14 may not be clearly split. Moreover, if the coating layers 13, 14 are heated and softened at and around the cutting lines (including the cramped area), the softened area can be deformed and consequently the end portion of the coating layers (particularly of the coating layer 13) can not be neatly removed so that debris of the coating layers may stick to the cutting edges 3a, 3b and the coated optical fiber 11.

Any debris of the coating layers attaching to the coated optical fiber 11 can deteriorate the accuracy with which the optical fiber is aligned with another optical fiber, while debris attaching to the coating cutting edges 3a, 3b can damage the optical fiber to be worked by the coating cutting apparatus in a succeeding cutting operation.

Secondly, the portion of coating layers 13, 14 of the coated optical fiber 11 clamped by the clamp members 1A, 1B should not be held too firmly by the members except the area to be cut the cutting edges.

The reason for this is that a pulling force that exceeds said excessive clamping force should be applied to the coated optical fiber 11 to damage the optical fiber when the optical fiber 12 is pulled away from the portion of the coating layers 13, 14 held by the clamp members 1A, 1B.

Thirdly, heat should be effectively conducted to the portion of the coated optical fiber 11 which is clamped by the clamp members 1A, 1B except the area to be cut in order to reduce the force that binds the optical fiber and the coating layers (particularly the coating layer 13).

This requirement should be met so that the optical fiber may be easily pulled away from the portion of the coating layers clamped by the clamp members 1A, 1B.

Any existing coating strippers do not satisfactorily meet the above requirements and are accompanied by a number of drawbacks including the effect of the heat transferred from the heater that can adversely affect the area to be cut. In short, these strippers are short of careful technological considerations on the clamping force applied to an end portion of a coated optical fiber, the problem of heating and effective separation of the split coating layers and the corresponding portion of the optical fiber.

In view of the drawbacks of the known coating stripper, it is therefore an object of the present invention to provide a coating stripper for optical fibers that can firmly and stably clamp a portion of a coated optical fiber, effectively thermally insulate the area of coating layers to be cut and provide an easy removal of a portion of the coating layers from the optical fiber.

SUMMARY OF THE INVENTION

According to the invention, the above object and other objects of the present invention are achieved by providing a coating stripper for optical fibers comprising a pair of clamp members each having a matching surface provided with a coating cutting edge, a coating pinching section and a coating holding section arranged in line on said matching surface with said coating pinching section located between said coating cutting edge and said coating holding section, any neighboring ones of said coating cutting edge, said coating pinching section and said coating holding section being contiguous with each other, each of said pair of coating cutting edges, said pair of coating pinching sections and said pair of coating holding sections being swingable relative to each other, both of said pair of coating pinching sections being made of a hard material, at least either of said pair of coating holding sections being made of a soft material and provided with a heater arranged in it.

A coating stripper for optical fibers according to the present invention may advantageously be so realized that its pair of coating pinching sections are thermally nonconductive.

A coating stripper for optical fibers according to the present invention may advantageously be so realized that both of the pair of coating holding sections are made of a soft material.

Alternatively, a coating stripper for optical fibers according to the present invention may advantageously be so realized that either of the pair of coating holding members is made of a soft material and the other holding member is made of a hard material.

The coating holding section which is made of a hard material of such a coating stripper for optical fibers according to the invention as described above may advantageously be thermally highly conductive.

A coating stripper for optical fibers according to the present invention may advantageously so realized that both of the pair of coating holding sections are provided with a heater.

OPERATION

A coating stripper for optical fibers according to the present invention is operated to remove a portion of the coating layers from a coated optical fiber in a manner as described below which is similar to the operation of a conventional coating stripper for optical fibers.

Firstly either of the clamp members is rotationally moved in order to separate the pair of coating cutting edges from each other as well as the pair of coating pinching sections and the pair of coating holding sections. Then the coated optical fiber is placed on the coating cutting edge, the coating pinching section and the coating holding section of the other clamp member at an end area of the coating and thereafter said first clamp member is moved back to close the pair of coating cutting edges as well as the pair of coating pinching sections and the coating holding sections. At the same time the end area of the coating layers is heated by the heater.

Now, the end area of the coated optical fiber is clamped by the pair of coating pinching sections and the pair of coating holding sections and the coating layers are cut by the pair of coating cutting edges.

If the coated optical fiber is pulled in a given direction under this condition, the coating layers are split along the cutting lines of the coating cutting edges and the optical fiber is pulled away from the portion of the coating layers separated and retained by the pair of clamp members.

When an end portion of the coating layers of a coated optical fiber is removed by means of a coating stripper according to the invention, it entails the following advantages.

(1) Since both of the pair of coating pinching sections are made of a hard material, the portion of the coating layers to be removed can be firmly clamped by the pinching sections of the stripper near the cutting lines.

Consequently, the area of the coating layers to be cut can be securely held so that the cutting edges may properly cut into the coating layers, which may in turn be clearly split.

(2) If both of said pair of coating pinching sections are thermally nonconductive, any heat that may otherwise be transferred to the area of the coating layers to be cut can be effectively blocked by the coating pinching sections.

As a result, the area of the coating layers to be cut clamped area will not be softened by heat and therefore free from any deformation so that the portion to be removed can be clearly taken away and any debris of the coating layers cannot stick either to the cutting edges or the coated optical fiber.

Thus, a coated optical fiber having an end portion removed by means of a coating stripper according to the invention is free from any reduction of accuracy with which it is aligned with another optical fiber or any damage that may be caused to it when a portion of the coating layers is removed.

(3) Since either of the pair of coating holding sections is made of a soft material, the portion of the coated optical fiber clamped by the clamp members is not subjected to an excessive clamping force except the area of the coating layers to be cut.

The above statement holds true when both of the coating holding sections are made of a soft material.

Therefore, under a condition where an end portion of a coated optical fiber is clamped by the pair of clamp members and that portion of the coating layers is cut away from the rest of the coating layers along predetermined cutting lines by means of the cutting edges, the optical fiber and be pulled away from that portion of the coating layers without requiring any excessive pulling force and/or damaging the optical fiber at the end portion.

(4) When either of the pair of coating holding sections is made of a soft material and the other is made of a thermally conductive hard material and provided with a heater, heat can be effectively transferred from the heater to the portion of the coated optical fiber clamped by the clamp members except the area to be cut by the cutting edges so that the force with which the heated end portion of the coating layers and the optical fiber are bound together may be significantly reduced.

The above statement will also hold true when either of the coating holding sections is made of a soft material while the front surface of the other is made of a thermally conductive hard material and its rear surface is made of a soft material, a heater being provided in said other coating holding section.

Therefore, a coating stripper according to the invention and having such a configuration can effectively and easily separate the optical fiber from the cut away end portion of the coating layers.

Now the present invention will be described in greater detail by referring to the accompanying drawings that illustrate a preferred embodiment of the invention.

DETAILED DESCRIPTION OF THE INVENTION

Figure 1:
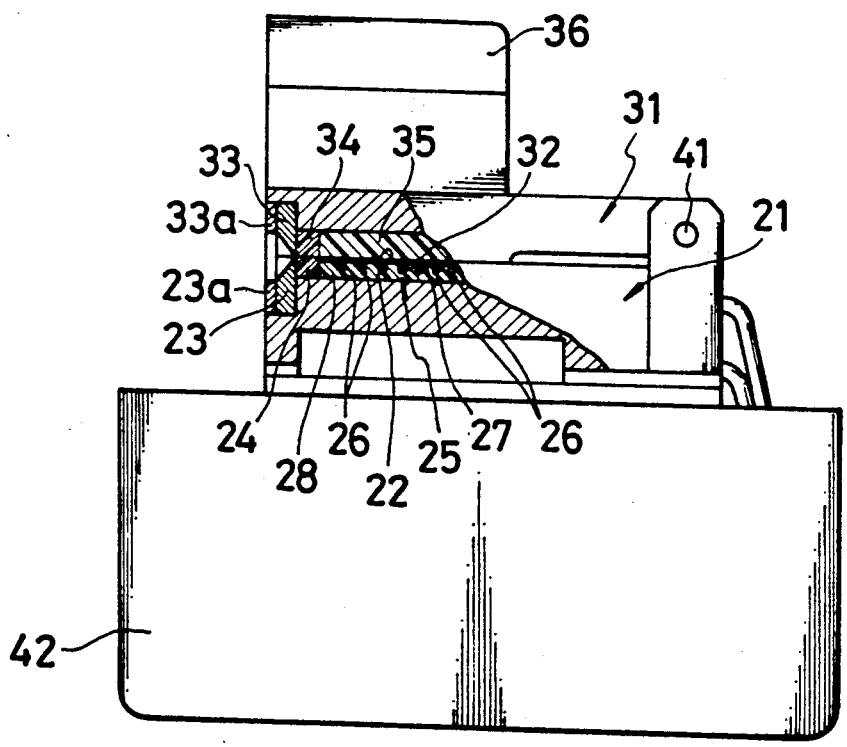
FIG. 1 is a partially cut out front view of an embodiment of the present invention.
Figure 2:
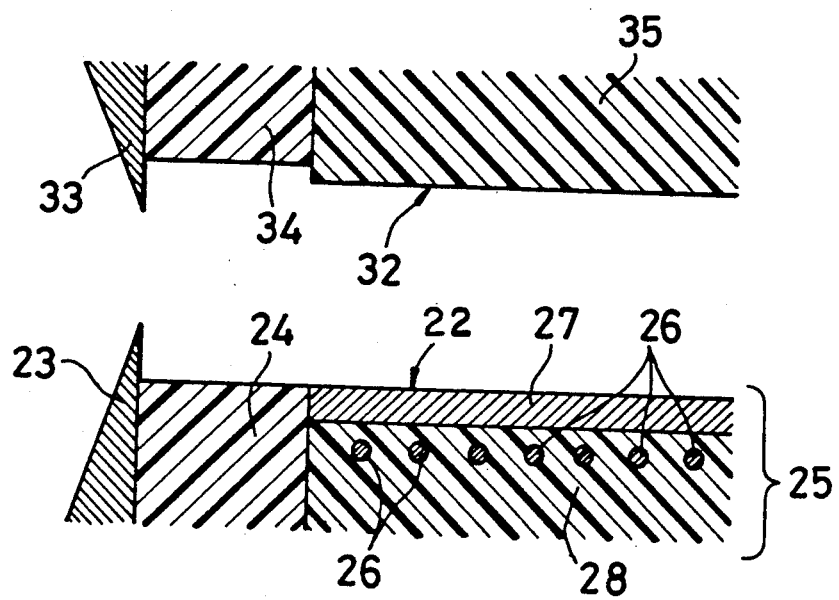
FIG. 2 is a sectional view of the embodiment of FIG. 1 showing its principal area on an enlarged scale.
Figure 3:
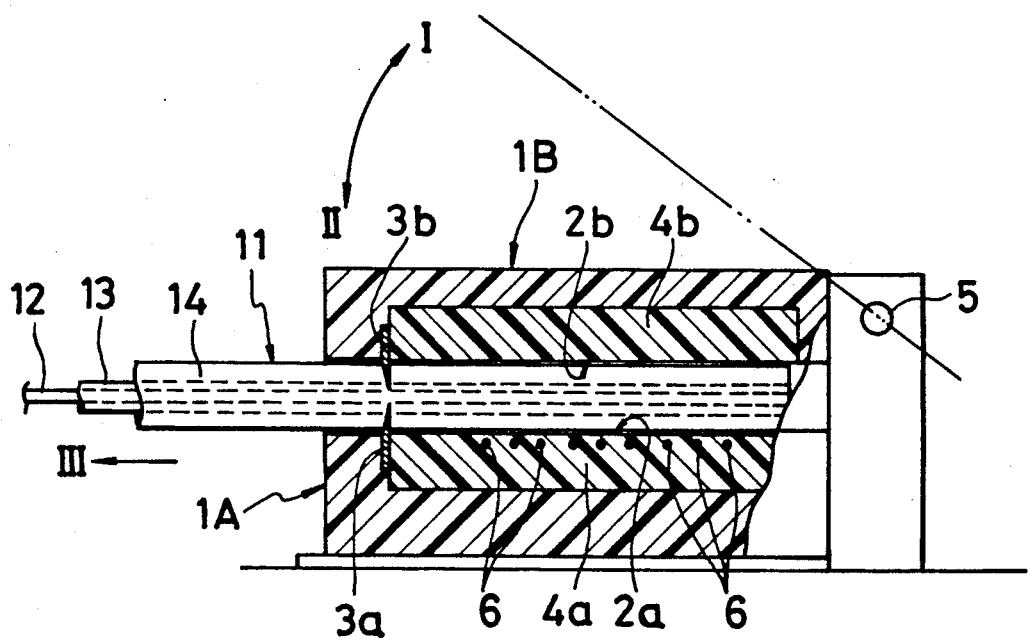
FIG. 3 is a partially cut out front view of a conventional coating stripper for optical fibers.
Figure 4:
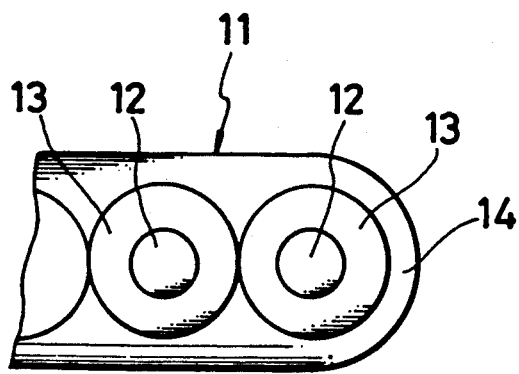
FIG. 4 is a sectional view of a coated optical fiber.

Referring to FIGS. 1 and 2, a pair of clamp members 21, 31 respectively have matching surfaces 22, 32, which are respectively provided with coating cutting edges 23, 33, coating pinching sections 24, 34 and coating holding sections 25, 35 arranged in such a manner that they form so many different pairs.

On the matching surface 22, the coating cutting edge 23, the coating pinching section 24 and the coating holding section 25 are arranged in this order from end to end, while the coating cutting edge 33, the coating pinching section 34 and the coating holding section 35 are arranged in this order from end to end of the other matching surface 32.

An electric heater 26 is incorporated in the coating holding section 25.

The coating holding section 25 is in fact a combination of a front side panel 27 and a rear side panel 28 and the heater 26 is embedded in the rear side panel 28 in close vicinity of the front side panel 27.

A handle 36 is provided on the outer surface of the cramp member 31.

Said clamp members 21, 31 having matching surfaces 22, 32 respectively are connected together by means of a hinge 41 of a known type in such a manner that the pair of coating cutting edges 23, 33 are swingable from each other and so are the pair of coating pinching sections 24, 34 as well as the pair of coating holding sections 25, 35.

While the two clamp members 21, 31 of the above embodiment are hinged together at a lateral edge thereof (the rightmost edge in FIG. 1), they may be alternatively hinged at the front or rear edge.

The connected clamp members 21, 31 are arranged on a support 42 as the clamp member 21 is rigidly fitted to said support 42.

The components of the stripper as described above are prepared in the following manner.

The pair of clamp members 21, 31 are made of a hard material such as metal, hard synthetic resin (including FRP), tempered glass or ceramics or a composite of any of these materials.

A preferred example of hard synthetic resin may be phenol resin (trade name: bakelite).

The pair of coating cutting edges 23, 33 are actually metal edges such as quenched steel edges which are rigidly fitted to the respective cramp members 21, 31 respectively by means of fitting plates 23a, 33a.

A rubber or synthetic resin insulating member may be fitted to the outer lateral surface of each of the coating cutting edges 23, 33.

The pair of coating pinching sections 24, 34 are also made of a hard material which is preferably thermally nonconductive.

Examples of materials that may be suitably used for the coating pinching sections 24, 34 include thermally resisting and insulating tempered glass, hard synthetic resin and ceramics.

The thickness of the coating pinching sections 24, 34 (the horizontal length of the sections in FIGS. 1 and 2) may be appropriately determined by paying due consideration to the type and shape of coated optical fiber 11 to which the stripper is applied and other factors.

For example, if the stripper is used for coated single fibers having a circular cross section, the thickness of the coating pinching sections 24, 34 will be determined as a function of the outer diameter of such optical fibers, whereas if flat type coated optical fibers are involved, the width of such flat type optical fibers should be taken into consideration in determining the thickness of the coating pinching sections 24, 34.

In case where all the coating pinching sections 24, 34 and the clamp members 21, 31 are made of a single and same material, the coating pinching sections 24, 34 may be integrally formed with the respective clamp members 21, 31.

As described earlier, the coating holding section 25 is realized by combining a front side panel 27 and a rear side panel 28.

The front side panel 27 is made of a thermally conductive hard material such as stainless steel, aluminum, copper or another metal.

The front side panel 27 may be provided with a groove for receiving a coated optical fiber 11.

The rear side panel 28 is made of a heat-resisting soft material such as silicon type soft rubber or soft synthetic resin.

Alternatively, the coating holding section 25 may be made of a single hard material. In such a case, it may be integrally formed with the clamp member 21 if the both the coating holding section 25 and the clamp member 21 are made of a single and same material.

The heater 26 is of a known type and therefore will not be described here any further.

The other coating holding section 35 is made of a heat-resisting soft material that may be identical with the material used for the rear side panel 28.

When the coating holding section 35 is made of a soft material which is heat-resisting and thermally insulating, the heater 26 may be embedded in this coating holding section 35 and not in the coating holding section 25 or in each of the coating holding sections 25 and 35.

The coating holding section 35 may be so arranged that it provides a common surface with the matching surface 32 or alternatively it may be so arranged that a portion thereof protrudes from the matching surface 32 as illustrated in FIG. 2. Conversely, the coating holding section 35 may be so arranged that it provides a recess from the matching surface 32.

Both the coating holding sections 25, 35 may be made of a soft material selected from those described earlier.

While the handle 36 and the support 42 may be made of a material having appropriate physical properties, they may preferably be made of a material which is used for the clamp members.

The illustrated embodiment will be operated in a manner as described earlier for clamping, heating and pulling so that an end portion of the coating layers 13, 14 of a coated optical fiber 11 can be removed from the outer periphery of the corresponding portion of the coated optical fiber 11 to expose the optical fiber 12.

Now some of the results of an experiment conducted by using a coating stripper according to the invention will be described.

For this experiment, a flat type coated optical fiber 11 comprising four optical fibers 12 arranged in parallel within an outer coating layer 14 was used.

Each of the optical fibers 12 of the coated optical fiber 11 was a quartz type having an outer diameter of 125 $\mu$m $\phi$ and surrounded by an inner coating layer 13 which was made of nylon. The four optical fibers were further contained in an outer coating layer 14 which was also made of nylon and had a width of 1.1 mm and a thickness of 400 $\mu$m.

The coating stripper used in the experiment was dimensionally so arranged that when its clamp members were completely closed, a pair of coating cutting edges it had provided a clearance of 125 $\mu$m and a clearance of 400 $\mu$m was produced by a pair of coating pinching sections, while a pair of coating holding sections showed a clearance of 50 $\mu$m. The heating temperature of heater 37 was set to 85° C.

When an end portion of the coating layers 13, 14 was removed from the coated optical fiber 11 by a given length by means of the stripper, the removing operation was carried out without any trouble as described earlier and the exposed outer periphery of the optical fibers 12 and the cut end of the coating layer 13 as well as that of the layer 14 showed a neat and excellent appearance. Almost no debris of the removed coating layers were observed in the stripper.

EFFECTS OF THE INVENTION

As is apparent from the above description, since a coating stripper for optical fibers according to the invention comprises a pair of clamp members as well as a pair of coating cutting edges, a pair of coating pinching sections and a pair of coating holding sections ingeniously arranged on the matching surfaces of the clamp members, it can securely clamp an end portion of a coated optical fiber and ensures good thermal insulation at and around the cutting lines of the coating layers, easy separation of the split coating layers and consequently an excellent performance of operation of removing an end portion of the coating layers of a coated optical fiber.

What is claimed is:

1. A coating stripper for optical fibers comprising a pair of clamp members each having a matching surface provided with a coating cutting edge, a coating pinching section and a coating holding section arranged in line on said matching surface with said coating pinching section located between said coating cutting edge and said coating holding section, any neighboring ones of said coating cutting edge, said coating pinching section and said coating holding section being contiguous with each other, each of said pair of coating cutting edges, said pair of coating pinching sections and said pair of coating holding sections being swingable relative to each other, both of said pair of coating pinching sections being made of a hard material, at least either of said pair of coating holding sections being made of a soft material and provided with a heater arranged in it.

2. A coating stripper for optical fibers according to claim 1, wherein both of the pair of coating pinching sections are thermally nonconductive.

3. A coating stripper for optical fibers according to claim 1, wherein both of the pair of coating holding sections are made of a soft material.

4. A coating stripper for optical fibers according to claim 1, wherein either of the pair of coating holding members is made of a soft material and the other holding member is made of a hard material.

5. A coating stripper for optical fibers according to claim 4, wherein the coating holding section which is made of a hard material is thermally conductive.

6. A coating stripper for optical fibers according to claim 1, wherein the coating holding section which is made of a hard material is provided with a heater.

7. A coating stripper for optical fibers according to claim 4, wherein the coating holding section which is made of a hard material is provided with a heater.

8. A coating stripper for optical fibers according to claim 5, wherein the coating holding section which is made of a hard material is provided with a heater.

* * * * *